CLARENCE W. CUTLER
INVENTOR.

United States Patent Office 3,100,982
Patented Aug. 20, 1963

3,100,982
CONTROLLED SHOCK OR IMPACT TESTING FIXTURE
Clarence W. Cutler, Riverside, Calif., assignor to the United States of America as represented by the Secretary of the Navy
Filed Dec. 28, 1960, Ser. No. 79,082
5 Claims. (Cl. 73—12)
(Granted under Title 35, U.S. Code (1952), sec. 266)

The invention herein described may be manufactured and used by or for the Government of the United States of America for governmental purposes without the payment of any royalties thereon or therefor.

The present invention relates to shock or impact testing apparatus and more particularly to a drop tower test fixture for shock or impact testing wherein a sleeve is provided to control the terminal velocity of the material to be tested.

The present device can operate to produce a shock pattern with a separate control of rise time with respect to dwell time, and to produce a shock pattern of from 2 to 500 times gravity without exceeding one gravity in accelerating or retarding a test specimen except for the shock pattern. Also, the present device permits a stationary instrumentation method for sensing and recording retarding force pattern imposed upon a specimen under test and translate this into an acceleration pattern against time.

Previous methods of shock testing sample specimens consisted of: Impact on a steel plate from free fall and had the disadvantage of producing erratic shock waves depending upon the striking attitude upon impact of the sample and the rebound developed; impact on rubber, lead or other material by free fall which had the disadvantage of producing various shock waves without separate control or extension of rise and dwell shape or time; Hyge, a device with a piston and carriage which accelerates the carriage with high values of acceleration for short duration and stops it by brake shoes on a track producing a saw tooth or a square wave uncontrolled as to flatness although rise and dwell times may be controlled separately; Air gun, a device having a long small diameter barrel, 4 to 8 inches in diameter and 10 to 20 feet long for example, for firing a pellet carrying a test specimen by releasing a large volume of high pressure air behind the pellet causing it to strike a target for impact primarily producing a high acceleration and an impact type shock complicated by the simultaneous flight of the pellet; Instrumentation by an accelerometer traveling with a test specimen and connected to instruments through attached wire which becomes difficult with long drops and impossible with towers of much height; and, measuring acceleration by camera means at several thousand frames per second; however, this method does not lend itself to pretest and repetitive adjustment of test without considerable cost in film and time.

The present invention eliminates the aforementioned disadvantages of prior methods for shock testing, and will produce a shock pattern with a dwell time which can be constant independently of time as well as a shock pattern with a rising, varying or decaying dwell time with separate control of every part of rise, dwell or fall of acceleration forces during shock pattern. The present apparatus, for example, can be used to produce a shock pattern by drop tower which will allow a low "gravity value" for a long duration, such as 10 gravities for 200 milliseconds, or a high "gravity value" for a shorter duration, such as 200 gravities for 10 milliseconds, or other combinations of time and "gravity" as desired.

It is an object of the invention, therefore, to provide a novel shock testing means producing a shock pattern with separate control of rise time with respect to dwell time.

Another object of the invention is to provide shock or impact testing apparatus which can produce a shock pattern with a dwell time which can be constant independently of rise time.

It is another object of this invention of providing means for producing a shock pattern of 2 to 500 times gravity without exceeding one gravity in accelerating or retarding a specimen except for the shock pattern.

A further object of the invention is to provide apparatus for producing by drop tower testing of a test specimen, varying or decaying dwell time with separate control of every part of rise, dwell or fall of acceleration forces during shock pattern.

Other objects and many of the attendant advantages of this invention will become readily appreciated as the same becomes better understood by reference to the following detailed descriptions when considered in connection with the accompanying drawings wherein.

Figure 1:
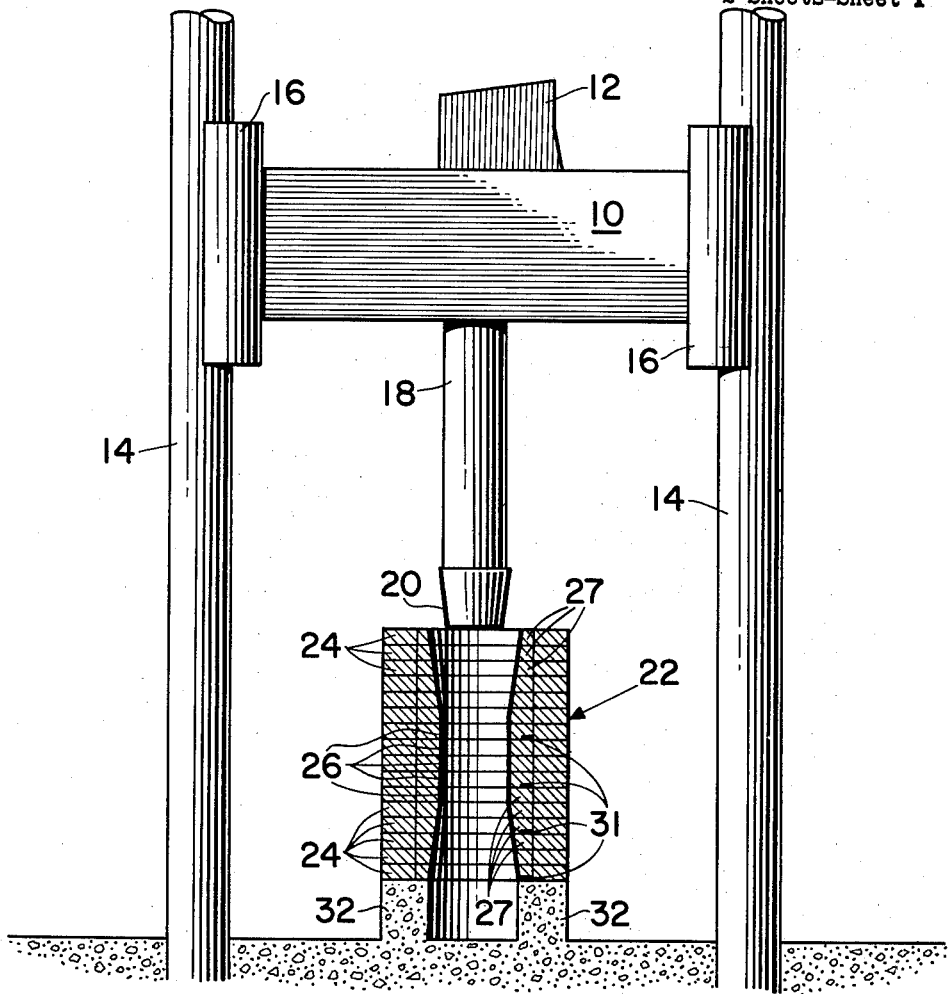
FIGURE 1 is an illustrative view partly in cross-section of a preferred embodiment of the invention showing the lower portion of a drop tower and test fixture.

FIGURES 3a through g illustrate some types of control of shock patterns produced by means of the present invention.

Referring now to the drawings, like numerals refer to like parts in the figures.

The present device is used with a free fall drop tower, from 5 to 300 feet in height for example, of which only a lower portion is shown in FIGURE 1 having a carriage 10 on which a test specimen 12 is mounted for shock or impact testing. Carriage 10 is guided along guide rods 14 by means of loosely fitting guide shoes 16. A blade 18 tapered at its lower end and extends downward from the underside of carriage 10 and has a rubbing surface 20 over the tapered end thereof. Blade 18 enters a tightly fitting friction scabbard 22 as carriage 10 approaches the end of a free fall.

Figure 2:
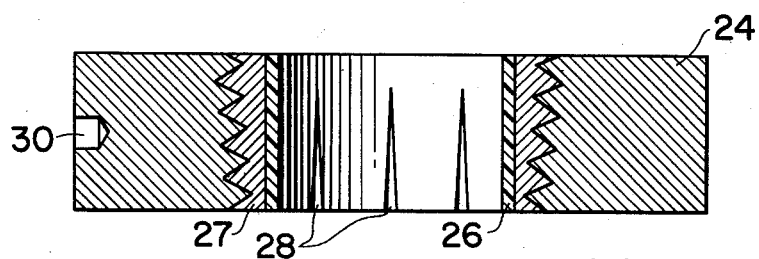
FIGURE 2 is an enlarged cross-sectional view of one of the adjustable sections of the scabbard of FIGURE 1.
Figure 3:
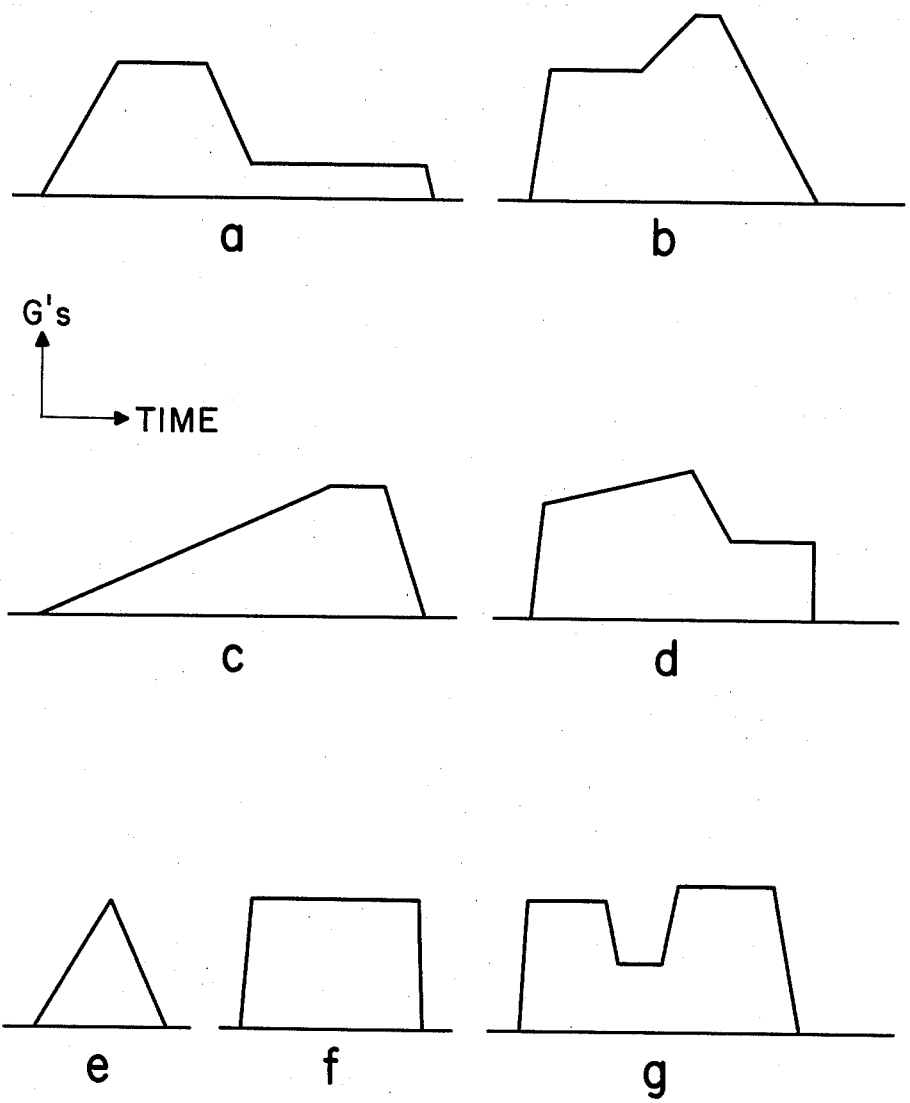

Scabbard 22 is made up of a plurality of adjustable collar sections 24 stacked one upon the other having friction lining 26 on their inner circumferences, forming a concatenated friction design of the scabbard. The concatenation may be obtained by any suitable means, such as by circular tongue and groove joints of the outer collars 24 and by dowel pins through inner collars 27 for example. Each collar section 24 has an inner portion 27 threaded therein having slots 28 in its body as shown in FIGURE 2. Adjustment of the collar sections is made after stacking them into a scabbard 22. The threads between collars 24 and 27 are inclined as shown in FIGURE 2; the inner collars 27 may be restrained from rotating by any suitable means such as dowels extending through the stack as aforementioned. Collars 27 may be slightly shorter in height than collars 24 so as to not protrude when the collars are adjusted. By means of a spanner wrench or the like engaging a collar section 24 and a hole 30 therein, the collar 24 can be turned closing slots 28 which also pass through lining 26 so that the lining can be made to fit more tightly about rubbing surface 20 of the blade as it progresses past an adjusted collar section of scabbard 22. By adjusting each of the plurality of adjustable collar sections 24 separately through the entire range of the stacked sections, any desired friction pattern can be produced. Some of the more common types of shock which may be produced on this device are shown in FIGURE 3. FIGURE 3a (a simulated rocket impulse ignitor shock of a sort) is produced by tightening the upper collars of stack 22 uniformly more tightly than those of the lower collars. FIGURE 3b is produced by tightening the lower collars of stack 22 more tightly than those of the upper collars. FIGURE 3c (modified saw-tooth shock) is obtained by gradual increase in tightness part way down the stack to a point, then uniform tightness for the flat portion of the pattern. FIGURE 3d is a variation of 3a. FIGURE 3e is a saw-tooth shock produced by uniformly decreasing the tightness of the collars both upward and downward from the center of stack 22. FIGURE 3f is a square wave (rocket ignitor shock simulation) effected by constant tightness throughout the stack. FIGURE 3g represents a "re-ignition shock" of a sort, produced by leaving one or more collars looser than those above or below this point in the stack. Many other variations in shock pattern may be produced by other combinations of collar tightness as required to simulate rocket in flight shock as experienced by rocket components.

A strain gage or other pressure sensing device can be placed between the scabbard stack 22 and the foundation block 32 or between every third adjustable collar section, as shown in FIGURE 1. If desired, a pressure sensing device can be positioned between each adjustable collar section 24 so that step by step pressure and position elements can be recorded in a shock pattern. Electrical connections can be brought out from the pressure sensing devices 31 to bridge circuits, memoscopes, oscilloscopes, oscillographs, meters, or the like.

The use of an adjustable scabbard assembly for control of friction hence controls the value of gravity "G" transferred to test specimen 12, and also control of shock duration giving both shape and duration control to shock pattern. Using pressure sensing elements 31 between collars to record progressive friction force exerted by lining 26 on blade 18 and hence on test specimen 12, and use of a memoscope or similar time sweep instrument in conjunction with the pressure sensing elements an acceleration rate vs. time curve can be recorded without direct instrumentation of a falling test specimen.

Another embodiment of this invention employs an air or gas piston with adjustable ports for controlling the progressive pressures, in place of a friction scabbard 22. Instrumentation in this cae is by gas pressure sensing instruments rather than by thrust force sensor.

Obviously many modifications and variations of the present invention are possible in the light of the above teachings. It is therefore to be understood that within the scope of the appended claims the invention may be practiced otherwise than as specifically described.

What is claimed is:

1. Shock testing apparatus for producing shock pattern with separate control of rise time with respect to dwell time for use with a drop tower having a carriage on which a test specimen is mounted for shock testing and guide means for guiding said carriage in free fall when allowed to fall from said tower comprising, a fixed blade extending downward from the underside of said carriage, said blade being tapered at its lower end and having a friction rubbing surface thereabout, a tightly fitting friction scabbard into which said blade enters as said carriage approaches the end of a free fall, said scabbard mounted at the base of said drop tower and a pressure sensing means between said scabbard and the base of said drop tower for recording the shock pattern of impact at the end of a free fall of carriage and test specimen.

2. Shock testing apparatus for producing shock pattern with separate control of rise time with respect to dwell time for use with a drop tower having a carriage on which a test specimen is mounted for shock testing and guide means for guiding said carriage in free fall when allowed to fall from said tower, a fixed blade extending downward from the underside of said carriage, said blade being tapered at its lower end and having a friction rubbing surface thereabout, a tightly fitting friction scabbard into which said blade enters as said carriage approaches the end of a free fall, said scabbard comprising a plurality of collar sections stacked one upon the other, each of said collar sections being separately adjustable for adjusting the tightness of fit of their inner surface about the surface of said blade as it enters said scabbard, pressure sensing means between said scabbard and the base of said drop tower for recording a shock pattern of impact at the end of a free fall of said carriage and test specimen, wherein by adjusting each of said plurality of collar sections any desired friction pattern can be produced.

3. A device as in claim 2 wherein pressure sensing means is placed between each of said adjustable collar sections for recording step by step in a shock pattern the pressure and position of the blade and thus the shock upon the test specimen.

4. A device as in claim 2 wherein the inner surface of said scabbard formed of a plurality of collar sections is concatenated for control of retarding force and thus the control of negative acceleration imposed upon the test specimen.

5. Shock testing apparatus for producing shock pattern with separate control of rise time with respect to dwell time for use with a drop tower having a carriage on which a test specimen is mounted for shock testing and means for guiding said carriage in free fall when allowed for fall from said tower comprising, a fixed blade extending from the underside of said carriage for friction fitting into a scabbard which is mounted at the base of said tower as said carriage approaches the end of a free fall, pressure sensing means on said scabbard for recording a shock pattern imparted to a test specimen mounted on said carriage at the end of a free fall thereof, said scabbard being composed of a plurality of adjustable sections stacked one upon the other and said pressure sensing means positioned between said adjustable sections wherein by adjusting each section of said scabbard any desired friction pattern can be produced and recorded step by step by said pressure sensing means.

References Cited in the file of this patent

UNITED STATES PATENTS

| 2,499,033 | Oberholtzer | Feb. 28, 1950 |
| 2,539,418 | Grogan | Jan. 30, 1951 |
| 2,940,552 | Freyler | June 14, 1960 |
| 2,982,122 | Schatz et al. | May 2, 1961 |
| 2,997,025 | Ottestad et al. | Aug. 22, 1961 |

FOREIGN PATENTS

| 1,143,703 | France | Apr. 15, 1957 |